(12) United States Patent
Huang et al.

(10) Patent No.: US 8,155,214 B2
(45) Date of Patent: Apr. 10, 2012

(54) ASYMMETRIC DECISION FEEDBACK EQUALIZATION SLICING IN HIGH SPEED TRANSCEIVERS

(75) Inventors: Dawei Huang, San Diego, CA (US); Deqiang Song, Dan Diego, CA (US); Jianghui Su, San Jose, CA (US); Drew G. Doblar, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 281 days.

(21) Appl. No.: 12/612,449

(22) Filed: Nov. 4, 2009

(65) Prior Publication Data

US 2011/0103458 A1    May 5, 2011

(51) Int. Cl.
*H04B 3/00* (2006.01)
*H04L 25/00* (2006.01)
(52) U.S. Cl. ......... 375/257; 375/229; 375/233; 375/317
(58) Field of Classification Search .......... 375/229–236, 375/257, 316, 317, 324, 340
See application file for complete search history.

(56) References Cited

U.S. PATENT DOCUMENTS

| | | | | |
|---|---|---|---|---|
| 4,327,440 | A | * | 4/1982 | Furuya et al. ................. 375/317 |
| 7,944,964 | B2 | | 5/2011 | Lee |
| 7,974,335 | B2 | | 7/2011 | Park |
| 7,978,797 | B2 | | 7/2011 | Marrow |

OTHER PUBLICATIONS

Belfiore, et al, "Decision Feedback Equalization," Proceedings of the IEEE, vol. 67, No. 8, Aug. 1979.
Park, et al, "Behavioral Simulation of Decision Feedback Equalizer Architectures Using CppSim," Oct. 2005, downloaded from internet: http://www-mtl.mitedu/researchgroups/perrottgroup/Tools/dfe_cppsim_tutorial.pdf.

* cited by examiner

*Primary Examiner* — Curtis Odom
(74) *Attorney, Agent, or Firm* — Meyertons, Hood, Kivlin, Kowert & Goetzel, P.C.; Erik A. Heter

(57) ABSTRACT

An asymmetric DFE receiver circuit is disclosed. The receiver circuit includes a voltage measuring unit configured to determine a signal voltage of a received signal, and a comparator unit configured to calculate a difference between the signal voltage and an evaluation threshold voltage and to compare the difference to the value of a midpoint voltage. The comparator unit is configured to generate a first control signal if the difference is greater than the midpoint voltage value or a second control signal if the signal voltage is less than the midpoint voltage value. The receiver includes an adjustment circuit configured to adjust the evaluation threshold voltage toward the signal voltage if the first control signal is generated and away from the signal voltage if the second control signal is generated. The rates of adjustment may vary depending upon whether the received signal is a transition bit or a non-transition bit.

20 Claims, 9 Drawing Sheets

US 8,155,214 B2

ASYMMETRIC DECISION FEEDBACK EQUALIZATION SLICING IN HIGH SPEED TRANSCEIVERS

BACKGROUND OF THE INVENTION

1. Field of the Invention

This invention relates to signaling in electronic systems, and more particularly, to methods and circuits for providing sufficient margins for received signals.

2. Description of the Related Art

As digital systems technology has advanced, data transmission rates have increased accordingly. Data transmission rates of over 1 Gb/s (gigabit per second) are commonplace in many digital system components, such as high-speed communications links digital integrated circuits. Digital signals transmitted over such high-speed communications links may be received by receiver circuits that are configured to sample received signals in order to determine their correct value (e.g., logic 0 or logic 1). Bit errors may be introduced if received signals are sampled incorrectly.

Signals transmitted over high-speed communications links may be subject to degradation that can in turn cause the signals to be sampled incorrectly. One cause of signal degradation may be jitter. Broadly speaking, jitter may be defined as timing variations in a signal resulting from phase shifts, frequency shifts, and so forth. Another cause of signal degradation may be inter-symbol interference (ISI). Broadly speaking, ISI occurs when one transmitted symbol interferes with another subsequently transmitted symbol (e.g., when a transmitted logic value interferes with the next transmitted logic value). ISI may result from impedance mismatches, reflections, and other imperfections in the signal path along which data values are transmitted.

To overcome the problems that may be introduced by jitter and ISI, various equalization techniques may be used. One such technique is known as decision feedback equalization (DFE). In implementing a receiver configured to perform DFE, the history of previous data transmissions may be considered. More particularly, for a particular signal path, a receiver using DFE may use information about bits previously transmitted on that signal line. A DFE receiver may feed back information based on received bits to compensate for ISI and jitter that may have been introduced by one or more previously received bits. Based on the compensation provided by the use of DFE, the occurrence of bit errors may be reduced, if not eliminated.

SUMMARY OF THE INVENTION

A receiver circuit is disclosed. In one embodiment, a receiver circuit includes a voltage measuring unit configured to determine a signal voltage of a received signal, and a comparator unit configured to calculate a difference between the signal voltage and an evaluation threshold voltage and to compare the difference to the value of a midpoint voltage, wherein the midpoint voltage is half the difference between a mean logic voltage for a logic 1 and a mean logic voltage for a logic 0. The comparator unit may be further configured to generate a first control signal if the difference is greater than the value of the midpoint voltage, and to generate a second control signal if the signal voltage is less than the value of the midpoint voltage. The receiver may also include an adjustment circuit configured to adjust the evaluation threshold voltage toward the signal voltage if the first control signal is generated and adjust the evaluation threshold voltage away from the signal voltage if the second control signal is generated.

In one embodiment, a method for operating an integrated circuit includes a transmitter transmitting a signal carrying digital data on a signal line and a receiver coupled to the signal line receiving the signal. Responsive to receiving the signal, a signal voltage of the received signal may be determined. After determining the signal voltage, a difference between the signal voltage and an evaluation threshold voltage may be calculated. A first control signal may be generated if the difference is greater than the value of a midpoint voltage. A second control signal may be generated if the difference is less than the midpoint voltage. An evaluation threshold voltage may be adjusted toward the signal voltage if the first control signal is generated. The evaluation threshold voltage may be adjusted away from the signal voltage if the second control signal is generated.

An integrated circuit (IC) including a transmitter and a receiver coupled by a signal line is also contemplated. The receiver is configured to determine a signal voltage of the received signal and to calculate a difference between the signal voltage and an evaluation threshold voltage. The receiver is further configured to generate a first control signal responsive to the difference being greater than a value of a midpoint voltage, wherein the midpoint voltage is half of a difference between a mean logic voltage for a logic 1 and a mean logic voltage for a logic 0, and to generate a second control signal responsive to the difference being less than the value of the midpoint voltage. The evaluation threshold voltage may be adjusted toward the signal voltage if the first control signal is generated, and may be adjusted away from the signal voltage if the second control signal is generated.

BRIEF DESCRIPTION OF THE DRAWINGS

Other aspects of the invention will become apparent upon reading the following detailed description and upon reference to the accompanying drawings in which.

Figure 1:
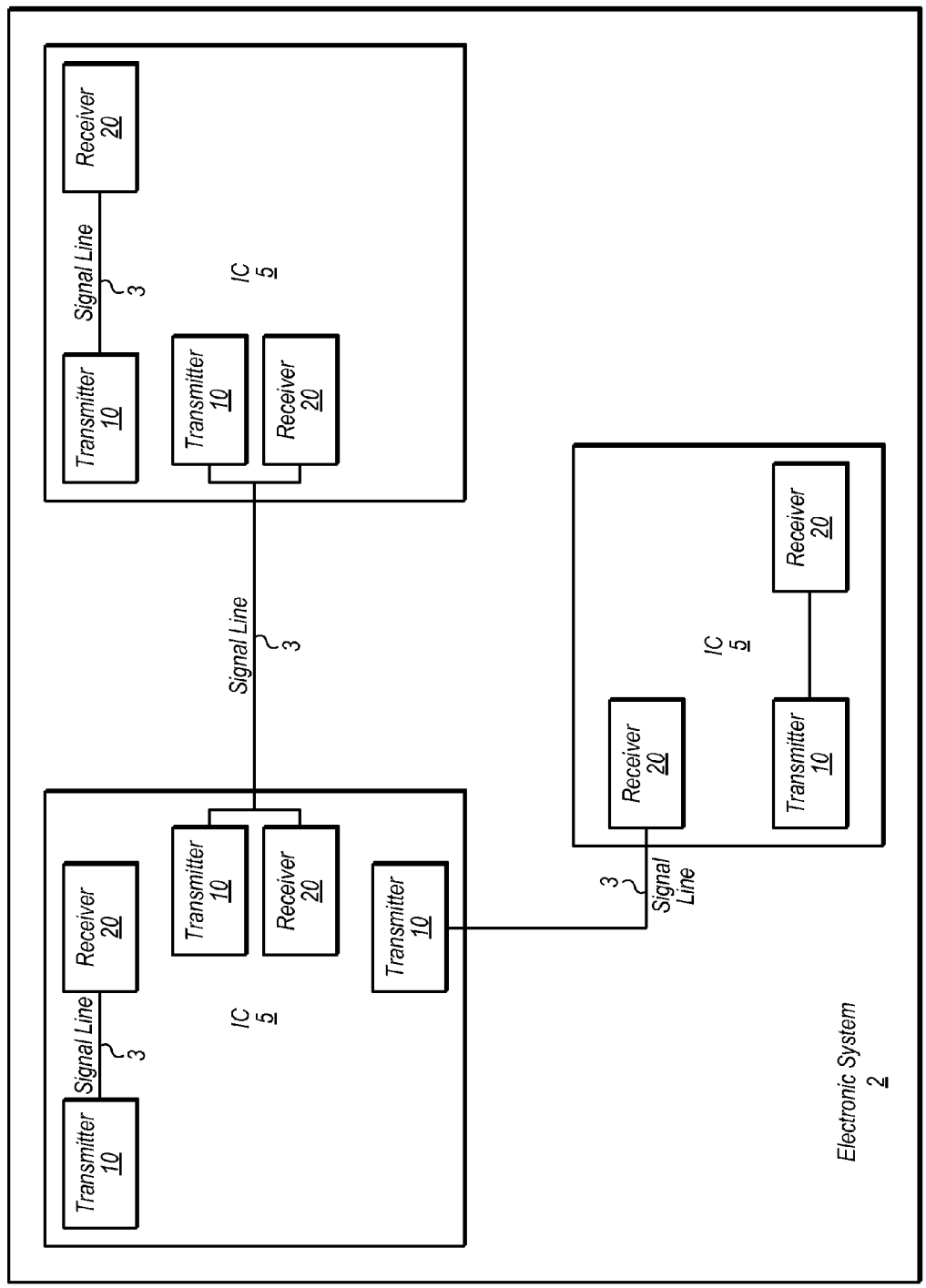
FIG. 1 is a block diagram of one embodiment of an electronic system having a plurality of integrated circuits (IC's)

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION OF THE INVENTION

Turning now to FIG. 1, a block diagram of one embodiment of an exemplary electronic system having a plurality of integrated circuits (IC's) is shown. In the embodiment shown, electronic system 2 includes three different IC's 5. Each IC 5 includes one or more transmitters 10 and one or more receivers 20. Each IC 5 may contain other circuitry as well, and it should be noted that the embodiment shown is exemplary.

Each transmitter 10 is configured to transmit signals carrying data received from other circuitry within its corresponding IC 5. More particularly, each transmitter 10 may transmit signals carrying data over a signal line 3 coupled thereto. The data may be received by a receiver 20 coupled to the other end of the corresponding signal line 3. The signal lines coupling each transmitter 10 to a corresponding receiver 20 may be contained within a single IC 5, or may be coupled one IC 5 to another IC 5 (e.g., such as a signal line on a printed circuit board).

Each receiver 20 may receive signals transmitted by a corresponding transmitter 10, and may determine whether the data carried by the signal corresponds to a logic 0 or a logic 1. A receiver 20 may determine whether or not a received signal is interpreted as a logic 1 or a logic 0 based on comparing a voltage of the received signal to a evaluation threshold voltage. Receiver 20 may be a DFE (decision feedback equalization) receiver, and thus the threshold voltage may be adjusted based on the history of logic values previously received. The threshold voltage may be adjusted toward a desired threshold value between a minimum voltage value (e.g., for a logic 0) and a maximum voltage value (for a logic 1). The desired threshold value may be positioned asymmetrically within the range of voltages between a maximum and a minimum in order to provide a wider range of voltages for a signal carrying a transition bit (i.e. a transition from logic 1 to logic 0, or vice versa). By biasing the target threshold voltage asymmetrically, the threshold voltage of the receiver may eventually converge at a value that provides a larger range of voltages for interpreting a transition bit and a smaller range of voltages for interpreting a non-transition bit. This will be explained in further detail below with reference to FIGS. 2-6.

Figure 2:
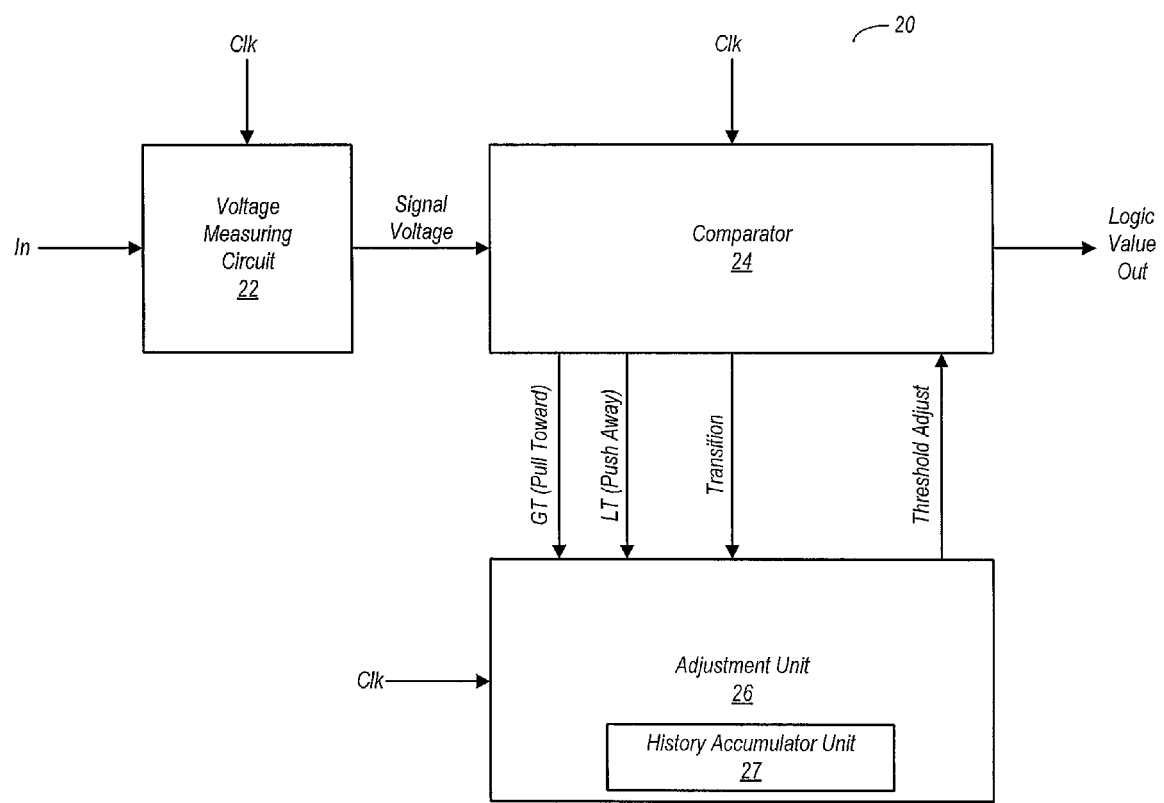
FIG. 2 is a block diagram of one embodiment of a receiver circuit.

FIG. 2 is a block diagram of one embodiment of a receiver circuit 20. In the embodiment shown, receiver circuit 20 includes a voltage measuring circuit 22, a comparator 24, and an adjustment unit 26. An input signal may be received by voltage measuring circuit 22, while comparator 24 may provide an output signal at the logic value of the received signal. Each of voltage measuring circuit 22, comparator 24, and adjustment in the embodiment shown is also coupled to receive a clock signal used to synchronize the sampling and evaluation of received signals. In some embodiments, the clock signal may be a forwarded clock signal received from the transmission side, although embodiments wherein a system clock signal is received are also possible and contemplated.

In the embodiment shown, voltage measuring circuit 22 may be an analog-to-digital converter (ADC). In general, voltage measuring circuit 22 may be any suitable type of circuit that is capable of measuring the voltage of a received signal. In this embodiment, voltage measuring circuit 22 may receive a signal and may convert the signal to a digital value indicative of its voltage. The digital value indicative of the signal voltage may be forwarded to comparator 24. Responsive to receiving the digital value indicative of the signal voltage, comparator 24 may compare the signal voltage to a evaluation threshold voltage value in order to determine whether or not the received signal is equivalent to a logic 0 or a logic 1. Comparator 24 may then provide the logic value as an output signal.

Figure 4:
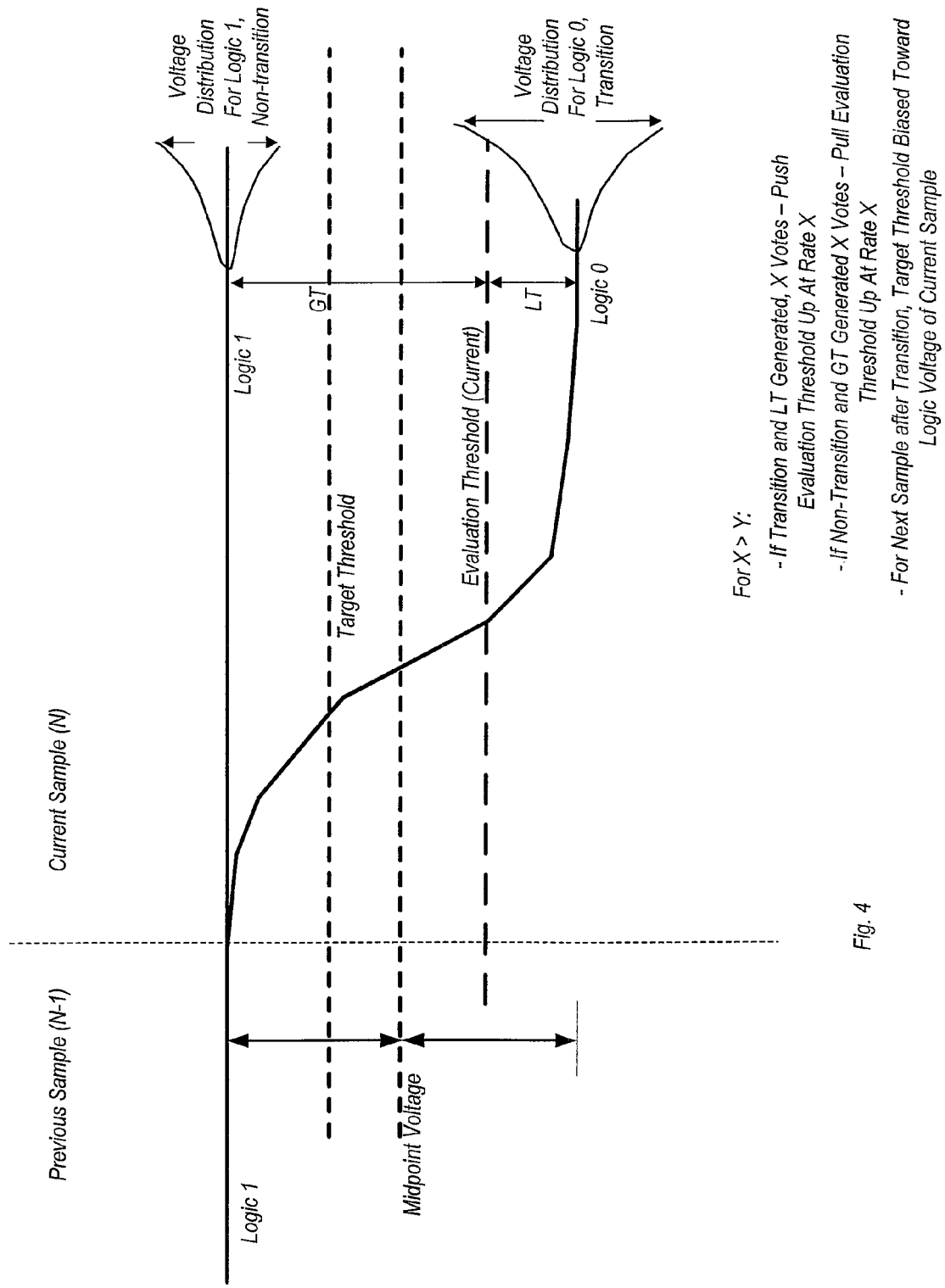
FIG. 4 is a diagram further illustrating the voltage relationships during operation of one embodiment of a receiver circuit.

The evaluation of the signal voltage to determine its logic value may be illustrated in, e.g., FIG. 4. In the example of FIG. 4, a sampled signal having a signal voltage that is greater than the indicated evaluation threshold voltage shown in the drawing may be interpreted as a logic 1. A sampled signal having a signal voltage less than the indicated evaluation threshold voltage may be interpreted as a logic 0.

As previously noted, receiver 20 may be a DFE receiver, wherein the evaluation threshold voltage is based on the history of the logic values one or more previously sampled signals. With each signal sampled, comparator 24 may update the evaluation threshold voltage. Working in conjunction with each other, comparator 24 and adjustment unit 26 may be configured to cause the evaluation threshold voltage to converge to a target threshold voltage if a large number of samples have the same logic value, as will be explained in further detail below.

The target threshold voltage for receiver 20 may be biased asymmetrically (i.e. off-center between a logic high voltage and a logic low voltage), such that it is closer to a voltage for a non-transition sample (e.g., previous sample logic 1, current sample logic 1) than to a voltage for a non-transition sample (e.g., previous sample logic 1, current sample logic 0). This may be in contrast to prior art embodiments wherein the target threshold voltage is positioned halfway between the maximum and minimum logic voltages, or halfway between the mean logic 1 voltage and the mean logic 0 voltage.

In one embodiment of receiver 20, if the full voltage swing between a logic 1 and a logic 0 is 1 volt, the target threshold voltage may be either ⅓ volt or ⅔ volt. Thus, in such an embodiment, if a previous sample was a logic 1 (i.e. at or close to 1 volt), the target threshold voltage may be ⅔ volt. Conversely, in such an embodiment, if the previous sample was a logic 0 (i.e. closer to 0 volts), the target threshold voltage may be ⅓ volt. As noted above, receiver 20 in the embodiment shown if configured such that, for a number of non-transition bits, the evaluation threshold voltage will converge with the target threshold voltage. For example, if a large number of logic 0's are consecutively received in this example, the evaluation threshold voltage may eventually converge to a target threshold voltage of ⅓ volt. Similarly, if a large number of logic 1's are received consecutively in this example, the evaluation threshold voltage may converge to a target threshold voltage of ⅔ volts. It should be noted that the values of ⅓ volt and ⅔ volt used herein are exemplary, and other target threshold voltage values are possible and contemplated.

The biasing of the target threshold voltage toward a non-transition position as described above may improve the voltage margin for transition bits. For signals transmitted over high-speed communication links, transition bits may have a larger voltage distribution than non-transition bits due to factors such as jitter and inter-symbol interference. Accordingly, receiver 20 may be configured to cause the evaluation threshold voltage to converge to a target threshold voltage that is biased toward the non-transition position in order to provide additional voltage margin for transition bits. This in turn may allow receiver 20 to more accurately interpret the correct logic values of received signals.

In addition to evaluating whether if the signal voltage of a sampled signal corresponds to a logic 1 or a logic 0, comparator 24 may also be configured to calculate a difference between the signal voltage and the evaluation threshold voltage, and to compare this difference with the value of a midpoint voltage. The midpoint voltage may be that voltage that is halfway between a mean logic voltage of a logic 1 and a mean logic voltage of a logic 0. For example, the midpoint voltage value is 0.5 volts in a system wherein the mean voltage for a logic 1 is 1 volt, and the mean voltage for a logic 0 is 0 volts. If comparator 24 determines that the difference between the signal voltage and the evaluation threshold voltage is greater than the midpoint voltage value, a first control signal, GT, may be generated. If, on the other hand, the difference between the signal voltage and the evaluation threshold voltage is less than the value of the midpoint voltage, a second control signal, LT, may be generated. The generated one of the control signals may be provided to adjustment unit 26.

If, for a given sample, adjustment unit 26 receives a GT signal from comparator 24, it may adjust the evaluation threshold voltage toward the signal voltage of the given sample (i.e. 'pull' the evaluation threshold voltage toward the signal voltage). On the other hand, if adjustment unit 26 receives an LT signal from comparator 24 for a given sample, it may adjust the evaluation threshold voltage way from the signal voltage of the given sample (i.e. 'push' the evaluation threshold voltage away from the signal voltage). The adjusted value of the evaluation threshold voltage may then be used for evaluation of the next sampled signal. Adjustment unit 26 may adjust the evaluation threshold voltage by providing one or more signals on the connection labeled 'threshold adjust'.

Adjustment unit 26 in the embodiment shown is further configured to adjust the evaluation threshold voltage toward a current target threshold voltage, regardless of whether the first or second control signal is generated. The current value of the target threshold voltage may be determined by the history of the most recently received bit. That is, a value of the target threshold voltage for cycle N may be determined by the logical value of the signal evaluated during cycle N−1, the most recent previous cycle. If a logic 1 was evaluated during cycle N−1, then the target threshold for cycle N may be biased toward a logic 1 voltage value. If a logic 0 was evaluated during cycle N−1, then the target threshold voltage may be biased toward a logic 0 voltage value.

Adjustment unit 26 may be further configured such that when it pulls the evaluation threshold voltage toward the current signal voltage, it may also pull the evaluation threshold voltage toward the current target threshold voltage. Similarly, adjustment unit 26 may push the evaluation threshold voltage toward the current target threshold voltage when the evaluation threshold voltage is pushed away from the current signal voltage. Generally speaking, each adjustment of the evaluation threshold voltage by adjustment unit 26 may involve adjusting the evaluation threshold voltage toward the current target threshold voltage.

When adjustment unit 26 adjusts the evaluation threshold voltage responsive to receiving a GT signal, it may effectively reduce the voltage margin for the logic value of the currently sampled signal, while widening the voltage margin for the complementary logic value. For example, the sampled signal is a logic 1, generation of the GT signal may cause the evaluation threshold voltage to be pulled toward the logic 1 voltage and away from a logic 0 voltage. This may in turn reduce the voltage margin for evaluating a logic 1 on the next signal to be sampled, while widening the voltage margin for evaluating a logic 0 on the next signal to be sampled.

If adjustment unit 26 adjusts the evaluation threshold voltage responsive to receiving an LT signal, it may effectively increase the voltage margin for the logic value of the currently sampled signal, while reducing the voltage margin for the complementary logic value. Thus, if a logic 1 is sampled in this case, the evaluation threshold voltage may be pushed away from the logic 1 voltage and toward a logic 0 voltage. Accordingly, the voltage margin for evaluating a logic 1 on the next signal sample may be increased, while the voltage margin for evaluating a logic 0 on the next signal sample may be decreased.

In addition to being coupled to receive the GT and LT signals from comparator 24, adjustment unit 26 is also coupled to receive a transition signal ('Transition'). Comparator 24 may assert the transition signal responsive to detecting the occurrence of a logical transition (e.g., logic 0 to logic 1 or vice versa) for the most recently sampled signal. The value of the transition signal (asserted or non-asserted) may be used to determine the rate of adjustment for the evaluation threshold voltage. In one embodiment, the evaluation threshold voltage may be adjusted at a first rate or a second rate, wherein the first rate is greater than the second rate. However, embodiments having a different number of adjustment rates are possible and contemplated.

In the embodiment shown, if a logical transition occurs and the GT signal is generated responsive to the difference exceeding the value of the midpoint voltage, the evaluation threshold may pulled toward the signal voltage at the first rate. If, on the other hand a logical transition occurs and the LT signal is generated (responsive to the difference being less than the value of the midpoint voltage), then the evaluation threshold voltage may be pushed away from the evaluation threshold voltage at the second rate. When no logical transition occurs and the first control signal is generated, the evaluation threshold voltage may be pulled toward the signal voltage at the second rate. When the second control signal is generated for a non-transition bit, the evaluation threshold voltage may be pushed away from the signal voltage at the first rate.

Adjustment circuit 26 also includes a history accumulator unit 27 in the illustrated embodiment. History accumulator unit 27 may store historical information regarding previously received signal samples. New historical information may be stored in history accumulator unit for each signal sampled by receiver 20, while old information may be purged. In one embodiment, history accumulator unit may operate as a FIFO (first in, first out) memory, where the oldest information (i.e. the first in) is purged (thereby becoming the first out) for each new signal sample. The amount of historical information stored in history accumulator unit 27 may vary among different embodiments.

Historical information stored in history accumulator 27 may include the recorded logic value for one or more previously signal samples. In addition, history accumulator 27 may also store information regarding whether or not sampled signals were evaluated as a logic 1 or a logic 0. In one embodiment that will be discussed below, history accumulator 27 may store vote information for a vote scheme implemented by receiver 20. The vote scheme may be used to determine the rates of adjustment of the evaluation threshold voltage based on a given signal sample.

Figure 3:
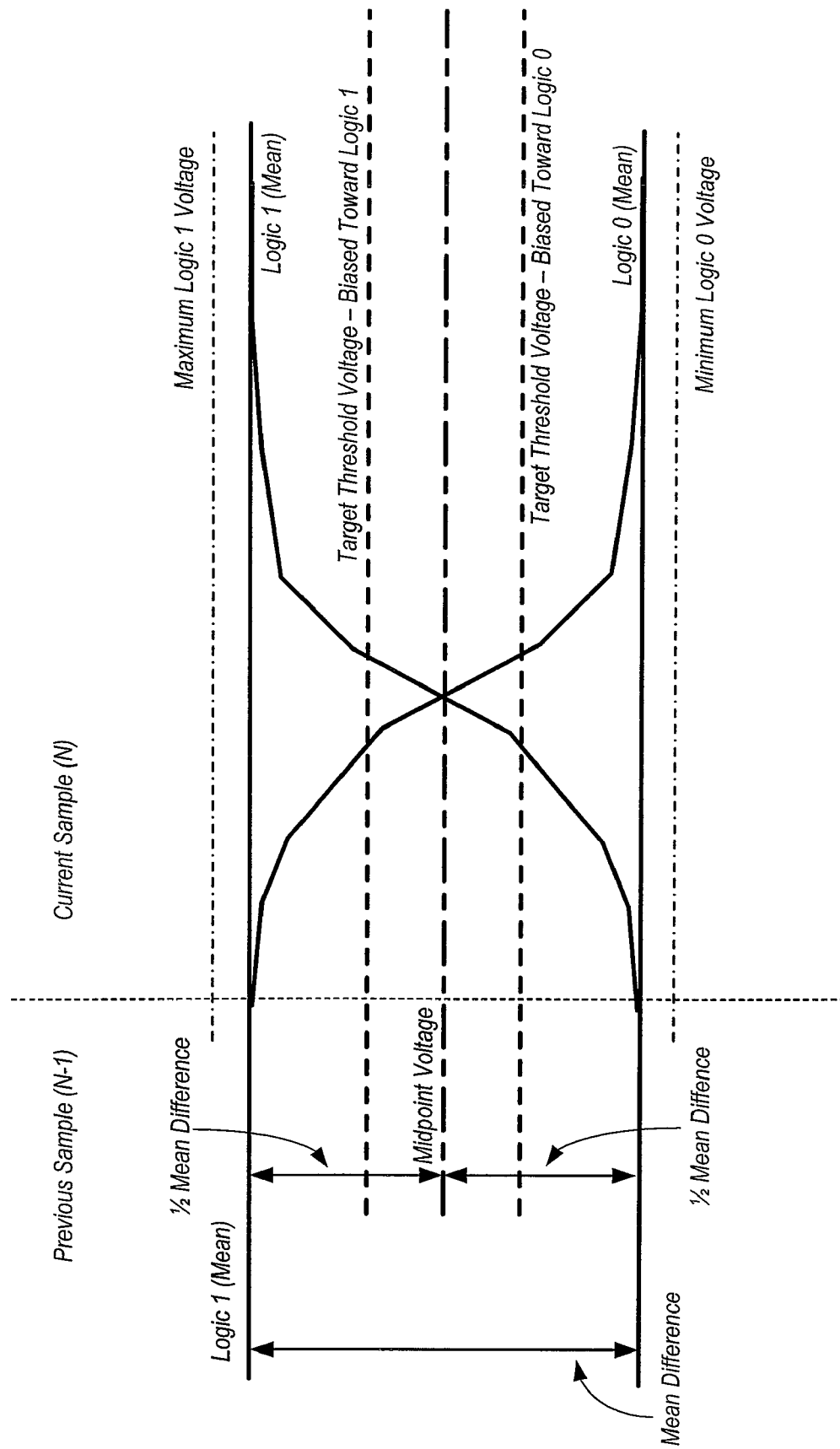
FIG. 3 is a diagram illustrating voltage relationships during operation of one embodiment of a receiver circuit.

Turning now to FIG. 3, a diagram illustrating voltage relationships during operation of one embodiment of receiver circuit 20 is shown. More particularly, FIG. 3 illustrates the biasing of target threshold voltages toward one of the logic values, and also illustrates the midpoint voltage.

In the example shown the target threshold voltage may be either biased toward a logic 1 or biased toward a logic 0. For example, if the most recently (e.g., during cycle N−1) sampled signal previous to the currently (e.g., during cycle N)

sampled signal was evaluated as a logic 1, then the target threshold voltage for the current cycle may be biased toward the logic 1 voltage. Conversely, if the most recently sample signal was evaluated as a logic 0, the target threshold voltage for the current cycle may be biased toward the logic 0 voltage. This is in contrast to prior art embodiments of DFE receivers wherein the target threshold voltage is not biased toward either of the logic 1 or logic 0 voltages, but instead is placed at a midpoint between the two. In such prior art embodiments, receivers may be designed such that an evaluation threshold voltage eventually converges to the target threshold voltage even if it varies therefrom for some samples. However, receiver 20 may be designed such that the evaluation threshold voltage tends to converge to the currently selected target threshold voltage. Furthermore, the target threshold voltage may be changed, during operation, from being biased toward a logic 0 voltage to being biased toward a logic 1 voltage, and vice versa. In the example shown in FIG. 3, one of the target threshold voltages is biased toward a maximum logic 1 voltage, and also toward a mean logic 1 voltage. Similarly, another target threshold voltage is biased toward a minimum logic 0 voltage, as well as toward a mean logic 0 voltage.

The asymmetric biasing may allow for a larger voltage margin for transition bits than for non-transition bits. For example, if the most recently sampled signal is a logic 1 and the target threshold voltage is biased toward the logic 1 voltage, the evaluation threshold voltage may been adjusted toward the target threshold voltage. For subsequent samples, a greater amount of voltage margin may be provided for transition bits (i.e. logic 1 to logic 0 in this particular case) than for non-transition bits (i.e. logic 1 to logic 1, in this case). This may allow for more accurate logic evaluations of sampled signals, since transition bits may tend to have a larger voltage distribution than non-transition bits.

As previously noted, a value of a midpoint voltage may be considered in determining the direction in which the evaluation threshold voltage is to be adjusted. In the example shown in FIG. 3, the value of the midpoint voltage is half of the difference between the mean logic voltages, and is located halfway between the mean logic voltage for a logic 1 and the mean logic voltage for a logic 0.

As previously noted, comparator unit 24 of receiver 20 may calculate a difference between the signal voltage of the currently sampled signal and the evaluation threshold voltage, and may generate one of the first or second control signals based on a comparison of the calculated difference. It should be noted that the difference value may be expressed in terms of absolute value, and may thus be unsigned. Consider the following examples wherein the difference between the mean logic 1 and logic 0 voltages is 1 volt, and the value of the midpoint voltage is 0.5 volts. In a first example, if the magnitude of the calculated difference between the signal voltage and the evaluation threshold voltage is 0.6 volts, the first signal may be generated, since the difference exceeds the value of the midpoint voltage. In a second example, if the magnitude of the calculated difference between the signal voltage and the evaluation threshold voltage is 0.1 volts, the second control signal may be generated.

In the first example discussed above, the evaluation threshold voltage may be, responsive to generation of the first control signal (GT), pulled toward the current signal voltage for evaluating the next received signal. Accordingly, if the current signal voltage is 0.2 volts, and the current evaluation threshold voltage is 0.8 volts for the first example, the evaluation threshold voltage may be pulled down toward 0.2 volts for evaluation of the next received signal. The exact voltage amount that the evaluation threshold is pulled down in the first example may depend on whether the currently received signal is a logical transition. If the currently received signal is evaluated as a logical transition, the evaluation threshold voltage may be pulled down farther (e.g., closer to 0.2 volts) than if the currently received signal is evaluated as a non-transition bit. In either case (transition or non-transition), the evaluation threshold voltage may be pulled toward the target threshold voltage.

In the second example, the evaluation threshold voltage may be, responsive to generation of the second control signal, pushed away from the current signal voltage responsive to generation of the second control signal. Thus, if the current signal voltage is 0.1 volts, and the current evaluation threshold voltage is 0.2 volts, the evaluation threshold voltage may be pushed up, away from the current signal voltage, for use in evaluating the next received signal. If the current signal is evaluated as a transition bit (e.g., logic 1 to logic 0 for this example), the evaluation threshold voltage may be pushed farther than if the current signal is evaluated as a non-transition bit. In either case, the evaluation threshold voltage may be pushed toward the current target threshold voltage.

Figure 5:
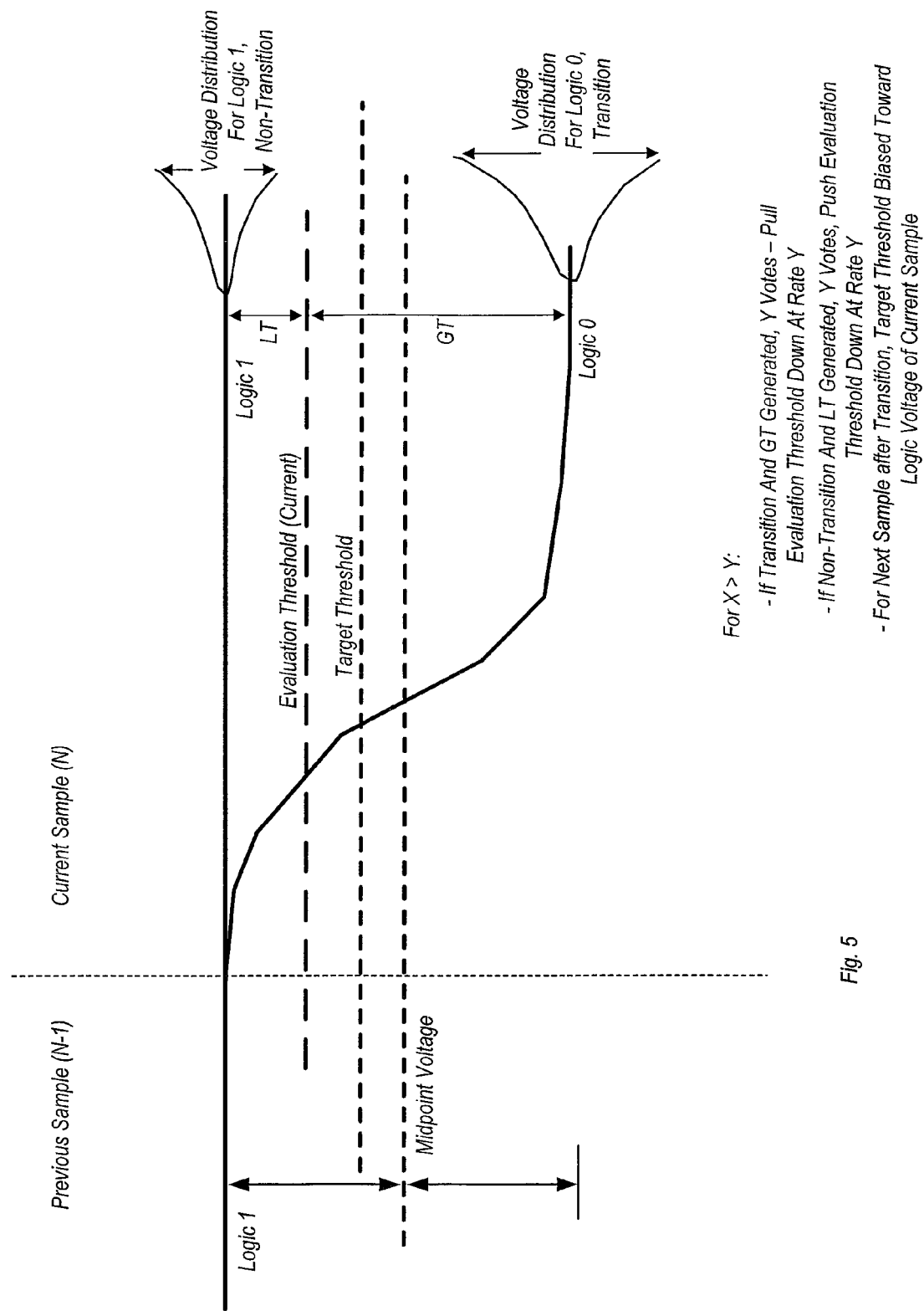
FIG. 5 is a diagram further illustrating the voltage relationships during operation of one embodiment of a receiver circuit.
Figure 6:
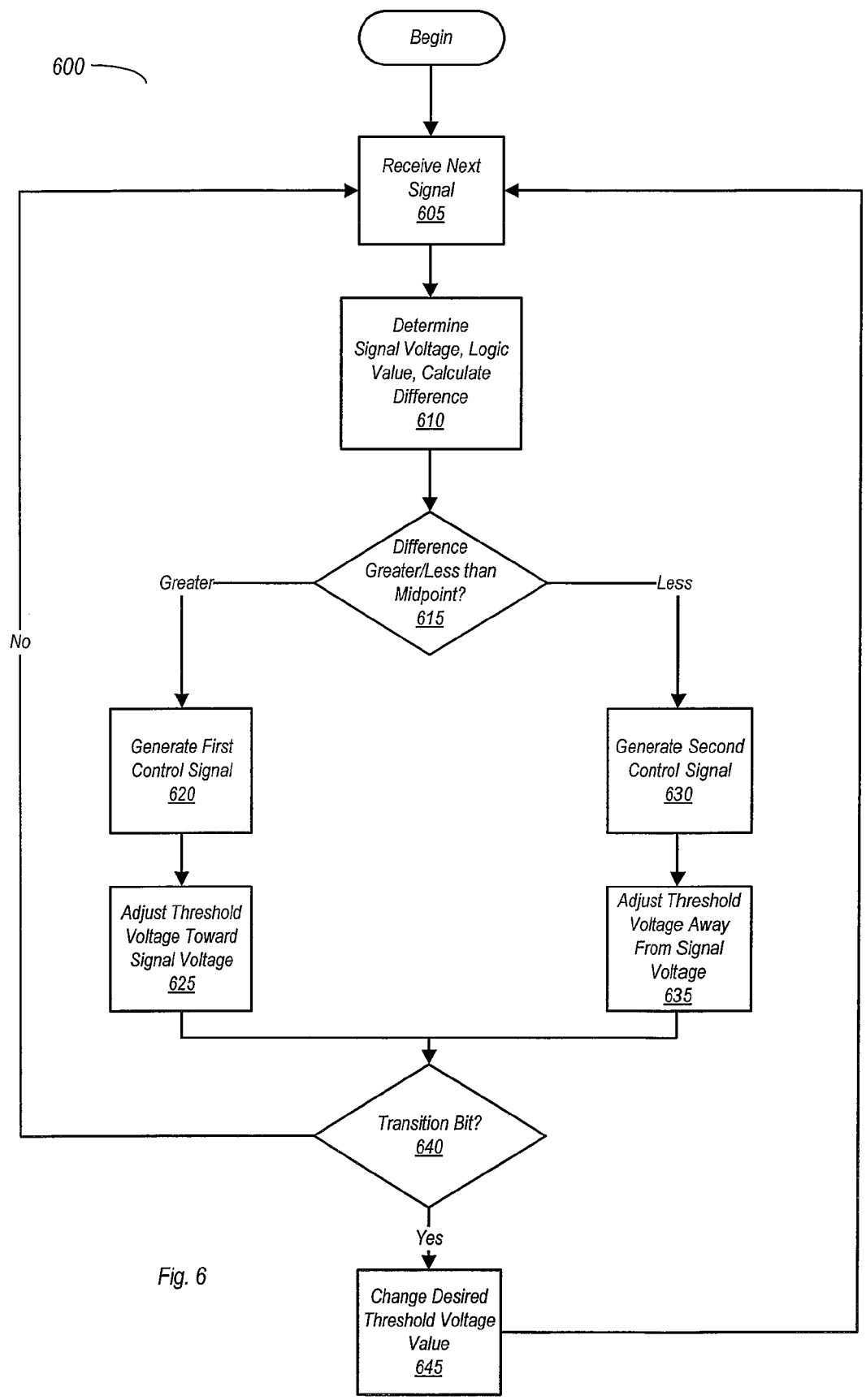
FIG. 6 is a flow diagram illustrating operation for one embodiment of a receiver circuit.

FIGS. 4 and 5 further illustrate operation for one embodiment of receiver 20. In the example each of FIGS. 4 and 5, the most recent previously sampled signal (N−1) was evaluated as a logic 1. The examples of each of FIGS. 4 and 5 illustrate the operation for both a logic 1 and a logic 0 received with the current signal sample (N).

Turning now to FIG. 4, a diagram further illustrating the voltage relationships during operation of one embodiment of a receiver circuit is shown. The current target threshold voltage is biased toward the logic 1 voltage in this example since the signal received in the most recent previous (N−1) cycle was evaluated as a logic 1. In the example shown, the current evaluation threshold voltage is lower than the current target threshold voltage. If the signal voltage of the currently sampled signal is below the evaluation threshold, it may be evaluated as a logic 0. If the signal voltage of the currently sampled signal is greater than the current evaluation threshold, it may be evaluated as a logic 1.

As shown in FIG. 4, evaluation of a logic 0 for the current sample represents a transition bit, while a logic 1 for the current sample is a non-transition bit. As also shown (via the cone-shaped outlines), the voltage distribution for a logic 0 is greater than the voltage distribution for a logic 1 in this case, since a logic 0 is a transition bit. The width of these voltage distributions may change over time. Generally speaking, for each non-transition bit received, the voltage distribution for the corresponding logic value may decrease. Furthermore, a consecutive number of bits received at the same logic value may cause an increase in the voltage distribution for a subsequent transition bit. Thus, the evaluation threshold voltage may be changed accordingly.

In the example of FIG. 4, if the signal voltage is such that a logic 0 is evaluated, an LT signal may be generated. Generation of the LT signal may result from the difference between the signal voltage and the evaluation threshold voltage being less than the value of the midpoint voltage. In other words, the LT signal may be generated when the difference between the signal voltage and the current evaluation threshold voltage is less than the value of the midpoint voltage. More generally, if $|V_s - V_{ct}| < |V_m|$ (where $V_s$ is the signal voltage, $V_{ct}$ is the current evaluation threshold voltage, and $V_m$ is the midpoint voltage), then the LT signal may be generated. Responsive to the generation of an LT signal in this case, the evaluation threshold voltage may be adjusted upward ('pushed up') toward the target threshold voltage, and away from the current signal voltage.

If the signal voltage in the example of FIG. 4 results in an evaluation of a logic 1, a GT signal may be generated. Generation of the GT signal may result from the difference between the signal voltage and the current evaluation threshold voltage being greater than the value of the midpoint voltage. Therefore, if $|V_s-V_{ct}|>|V_m|$, then the GT signal may be generated. Responsive to generation of the GT signal in this example, the evaluation threshold may be adjusted upward ('pulled up') toward the target threshold voltage, as well as being pulled toward the current signal voltage.

FIG. 5 is a diagram illustrating another example. In the example of FIG. 5, if a logic 1 (i.e. a non-transition bit in this case) is received, an LT signal may be generated, since $|V_s-V_{ct}|<|V_m|$ in this instance. Responsive to generation of the LT signal in this example, the evaluation threshold voltage may be adjusted downward ('pushed down') toward the target threshold voltage, as well as being pushed away from the current signal voltage.

If a logic 0 is received (i.e. a transition bit in this particular example), a GT signal may be generated, since $|V_s-V_{ct}|>|V_m|$. The evaluation threshold voltage may be adjusted downward ('pulled down') toward the target threshold voltage responsive to generation of the GT signal, as well as being pulled toward the current signal voltage.

As previously noted, some embodiments of receiver 20 may implement a vote scheme to determine the rate of adjustment of the evaluation threshold. The rate of adjustment of the evaluation threshold voltage may be determined based on whether or not a GT or LT signal is generated for a given signal sample, and whether the data of the given signal sample is a transition bit or a non-transition bit. Table 1 below outlines one possible voting scheme.

TABLE 1

| Non-Transition Bit | | Transition Bit | |
|---|---|---|---|
| GT | LT | GT | LT |
| X Votes | Y Votes | Y Votes | X Votes |

For X > Y

In accordance with Table 1, wherein X>Y (e.g., X=2 Y=1), a sample that is a non-transition bit may generate X votes if a GT signal is generated, and may generate Y votes if an LT signal is generated. For a transition bit, Y votes may be generated responsive to the generation of a GT signal, while X votes may be generated responsive to the generation of an LT signal. The number of votes generated may correspond to the rate of adjustment. Thus, X votes may result in a higher rate of adjustment than Y votes in this example, since X>Y.

In one embodiment, the number of votes generated may be indicative of a rate of adjustment of the evaluation threshold voltage. Returning to FIG. 4 if a logic 1 is received (non-transition bit since the previous value was a logic 1) and a GT signal is generated, X votes are generated. Accordingly, the evaluation threshold voltage may be pulled up toward the target threshold voltage at a rate of X. If a logic 0 is received (a transition bit, since the previous value was a logic 1) in the example of FIG. 4, an LT signal is generated and thus X votes are also generated. Accordingly, the evaluation threshold voltage may be pushed up toward the target threshold voltage at a rate of X.

For the example shown in FIG. 5, if a logic 1 is received (a non-transition bit), an LT signal is generated. Responsive to generation an LT signal for a non-transition bit, Y votes are generated, and thus the evaluation threshold voltage may be pushed toward the target threshold voltage at a rate of Y. If a logic 0 (a transition bit) is received in the example shown in FIG. 5, a GT signal is generated. Responsive to the generation of a GT signal for a transition bit, Y votes are generated, and thus the evaluation threshold voltage is pulled down toward the target threshold voltage at a rate of Y.

Since the rates of adjustment (X and Y) are different, the evaluation threshold voltage may eventually converge with the target threshold voltage that is off-center with respect to the maximum voltage swing between a logic 1 and a logic 0. For example, if a maximum voltage swing between a logic 1 and a logic 0 is 1 volt for a particular embodiment, then the target threshold voltage may be set at either ⅓ volt or ⅔ volt. Accordingly, if X=2 and Y=1, and the maximum voltage swing between a logic 1 and a logic 0 is 1 volt, the embodiment discussed above utilizing the vote scheme outlined in Table 1 may cause the evaluation threshold voltage to converge with target threshold voltage of either ⅓ volt or ⅔ volt, depending on the currently received logic value and the history of received logic values.

It should be noted that while the example above utilizes two different rates of adjustment, embodiments using more than two rates of adjustment are possible and contemplated. Furthermore, the various embodiments disclosed herein may be arranged such that, regardless of the rate or amount of adjustment of the evaluation threshold voltage for any given cycle, the various embodiments of adjustment unit 26 discussed above may be configured such that the evaluation threshold voltage is moved toward the current target threshold voltage for any given adjustment. Accordingly, adjustment unit 26 may in some cases attenuate some adjustments (e.g., in rate or amount) of the evaluation threshold voltage in order to prevent the Turning now to FIG. 6, a flow diagram illustrating operation for one embodiment of a receiver circuit is shown. In the embodiment shown, method 600 begins with the receiving (or sampling) of the next signal (block 605). After sampling the signal, the signal voltage and thus the logic value of the received signal may be determined (block 610). In one embodiment, the determination of the signal voltage may be performed by an ADC, which evaluates the analog voltage of the sampled signal. A comparator may compare the signal voltage to an evaluation threshold voltage to determine whether or not the data carried on the signal is a logic 0 or a logic 1.

In addition to indicating whether the data carried on the signal is a logic 0 or a logic 1 (by comparing the signal voltage to the evaluation threshold voltage), a difference between the signal voltage and the evaluation threshold voltage may be calculated, with this difference being compared to the value of midpoint voltage (block 615). If the difference is greater than the value of the midpoint voltage (block 615, greater), then a first control signal may be generated (block 620). Responsive to the generation of first control signal, the evaluation threshold voltage may be adjusted toward both the signal voltage and the target threshold voltage (block 625). As previously noted, the rate of adjustment may be dependent on whether or not the sampled signal is a transition bit (i.e. logic 1 to logic 0 or vice versa).

If the difference is less than the value of the midpoint voltage (block 615, less), a second control signal may be generated (block 630). Responsive to generation of the second control signal, the evaluation threshold may be adjusted away from the signal voltage and toward the target threshold (block 635), at a rate which may be determined by whether or not the sampled signal is a transition bit.

If the sampled signal is a transition bit (block 640, yes), then the target threshold may be changed. For example, consider a case wherein the previous signal sample was a logic 1 and the target threshold is ⅔ volt (wherein the difference between a mean logic 1 voltage and a mean logic 0 voltage is 1 volt). If the current signal sample is a logic 0, which is a transition from the logic 1 on the prior signal sample, then the target threshold may be changed to ⅓ volt for the next signal sample. If the sampled signal is not a transition bit (640, no), the method continues with the sampling of the next signal (block 605). In the embodiments of receiver 20 discussed above, the changing of the target threshold voltage does not require an actual voltage adjustment to be performed by adjustment unit 26. However, adjustment unit 26 may record for each sample whether or not a transition occurs in order to determine what the target threshold voltage is to be for the next signal sample. For any given sample, adjustment unit 26 may adjust the evaluation threshold voltage toward the current target threshold voltage.

Figure 7:
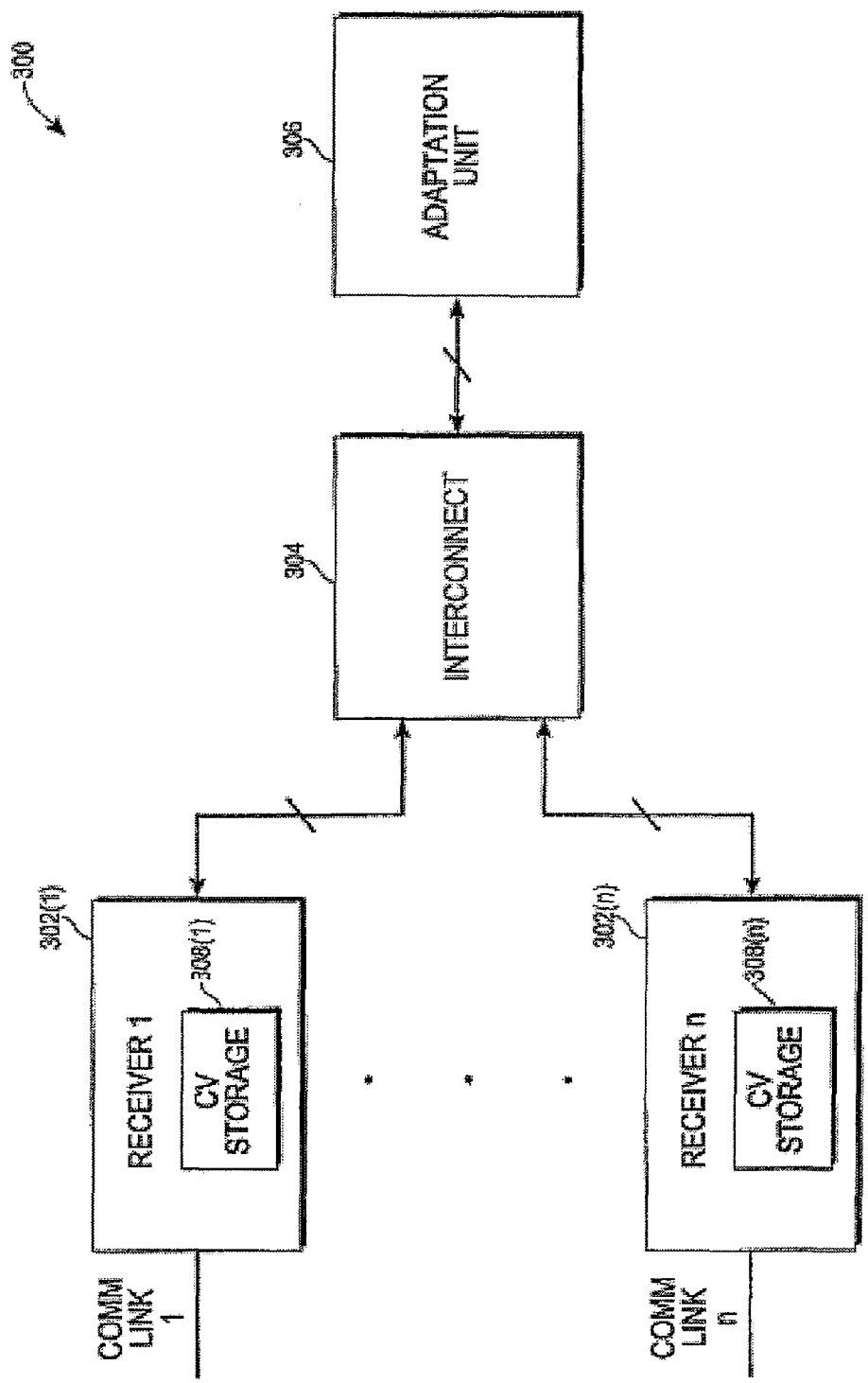
FIG. 7 is a block diagram of one embodiment of an electronic system including an adaptation unit shared among a plurality of receivers.

While the embodiments discussed above have been controlled at the level of the receiver itself, other embodiments are possible and contemplated wherein an adaptation unit may perform at least some of the control functions for a number of receivers. An embodiment of a system including such receivers is shown in FIG. 7. Turning now to FIG. 7, a block diagram of one embodiment of an electronic system including an adaptation unit shared among a plurality of receivers. In the embodiment shown, a plurality of receivers 302(1)-302(*n*) are coupled, via corresponding communications links, to an interconnect unit 304, which is coupled in turn to an adaptation unit 306. Thus, adaptation unit 306 is shared among the plurality of receivers 302. In addition, each receiver 302 is coupled to a corresponding communication link (e.g., 'COMM LINK 1' for receiver 1, etc.) via which it is coupled to receive signals transmitted by a transmitter at the other end of the communications link. These communication links may be wires, signal traces, or other types of signal paths, including interconnections within an IC.

Each receiver 302 in the embodiment shown includes a compensation value (CV) storage unit 308 (e.g., CV storage unit 308(1) in receiver 1, etc.). Each CV storage unit 308 may store digital compensation values that may enable its corresponding receiver to compensate for effects (e.g., reflections) of previously sent pulses. The compensation values may correspond to combinations of previously received history bits.

Interconnect 304 may couple receivers 302 to adaptation unit 306 in accordance with a sharing scheme. Such sharing schemes include, but are not limited to, round robin, equal time sharing, a weighted sharing scheme, a priority scheme, or any other suitable type of sharing scheme, as well as various combinations of sharing schemes.

Adaptation unit 306 may perform various functions for each of the receivers 302 to which it is coupled. For a given receiver 302 which adaptation 306 is coupled, it may perform functions to customize the compensation values stored in a corresponding CV storage unit 308, and may also perform various ones of the functions discussed above that are performed by adjuster 26 in the embodiment of FIG. 2.

Figure 8:
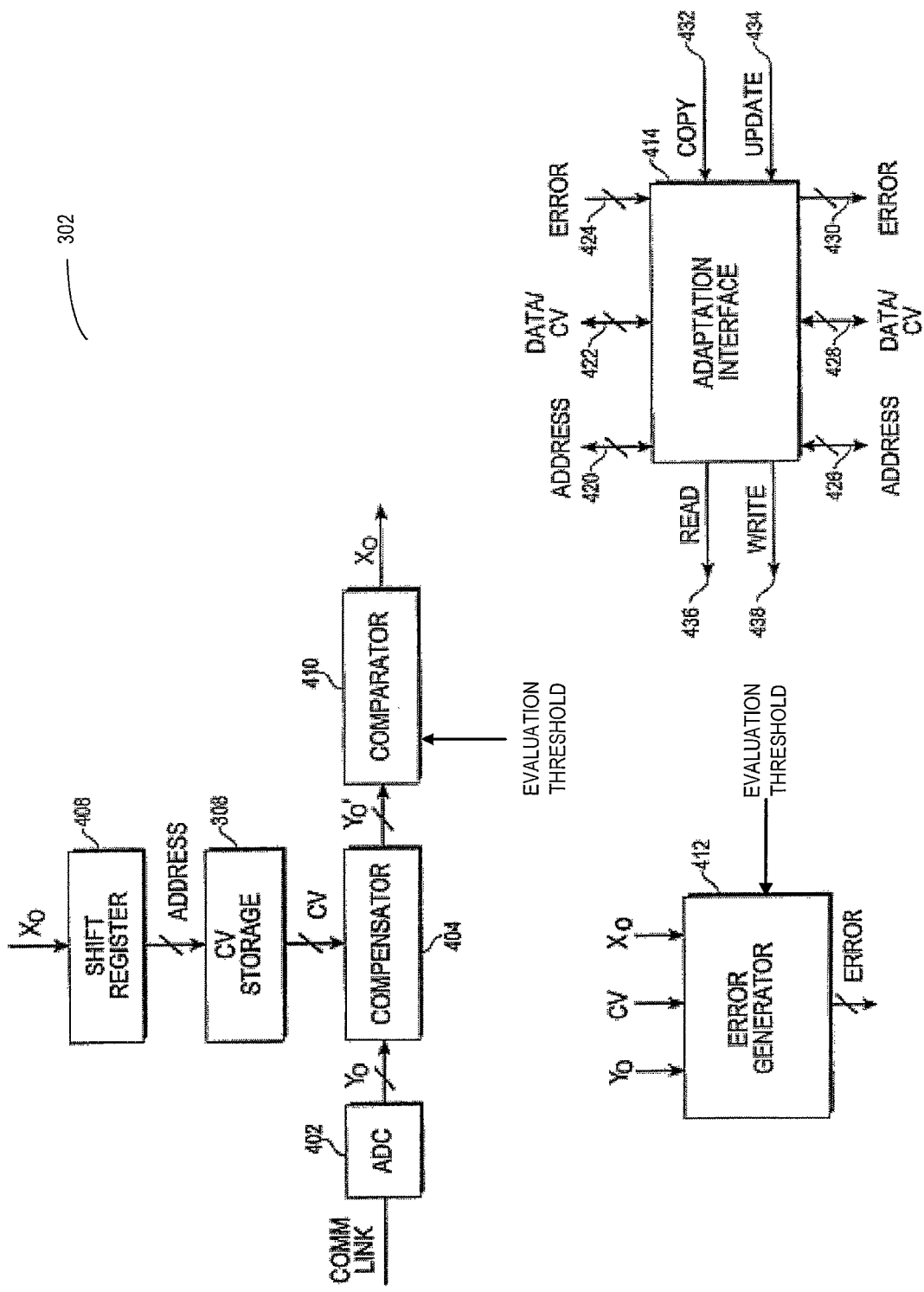
FIG. 8 is a block diagram of one embodiment of a receiver circuit configured for use in the system of FIG. 7.

Turning now to, FIG. 8 is a block diagram of one embodiment of a receiver circuit configured for use in the system of FIG. 7. In the embodiment shown, receiver 302 include ADC 402, which is coupled to a communications link, and is configured to convert the analog voltage of a sampled signal into a digital value, $Y_0$. The digital value may be provide to compensator 404, which also receive a compensation value from CV storage unit 308. Compensator 404 may subtract the received compensation value from the digital value $Y_0$ in order to compensate for various effects and/or contributions from previously received signal samples, in order to produce a compensated digital value, $Y_0'$. The compensated digital value $Y_0'$ may be received by comparator 410 and compared to an evaluation threshold voltage. If the compensated digital value $Y_0'$ is greater than a digital equivalent of an evaluation threshold voltage, it may be evaluated as a logic 1. Otherwise, if the compensated digital value $Y_0'$ is less than the digital equivalent of the evaluation threshold voltage, it may be evaluated as a logic 0. In the embodiment shown, comparator unit 410 includes an input for receiving the evaluation threshold, which may be provided from adaptation unit 306 via interconnect 304. The result of the operation performed by comparator 410 may be output as $X_0$, which is the logic value of the received signal.

The logic value $X_0$ output by comparator 410 may be fed back into receiver 302 via an input into shift register 408, which may store a plurality of logic values corresponding to the most recently sampled signals. For example, shift register may be configured to store the logic values for the five most recently received signal samples. However, it is noted that the number of logic values stored may vary from one embodiment to the next. The pattern of logic values (e.g., '11010') may form address information that is provided to CV storage unit 308. The address information may point to a location in CV storage unit 308 where a compensation value corresponding to that pattern is stored. Accordingly, when the address information is applied to CV storage unit 308, the corresponding compensation value may be selected and provided to compensator 404.

Receiver 302 also includes an error generator 412 in the embodiment shown. Error generator 412 may be configured to generate and provide error information to adaptation unit 306 in order to enable to determine when compensation values, evaluation thresholds, and target thresholds are to be updated. In the embodiment shown, error generator is coupled to receive the logic value $X_0$, the digital value $Y_0$, the compensation value, and the evaluation threshold. Responsive to receiving these values for a given signal sample, error generator 412 may perform various calculations and provide the results via the error output, which may include multiple bits of information. The calculations performed by error generator 412 may include calculating a difference between the evaluation threshold and the value of $Y_0$ or $Y_0'$ (which may be calculated based on the CV and $Y_0$ received). Error generator 412 may also determine, based on the value of $X_0$, whether or not the most recently received bit is a transition bit. This information may then be provided to adaptation unit, which may perform additional calculations (e.g., a comparison of the difference between a signal voltage and an evaluation threshold voltage to a value of a midpoint voltage in order to determine the rate and adjustment of the evaluation threshold voltage for the next signal sample).

In the embodiment shown, receiver 302 also includes an adaptation interface 414, which may enable receiver 302 to interact with adaptation unit 306. The adaptation unit may be configured to couple the internal components of receiver 302 via a set of address lines 420, a set of data/CV lines 422, a set of error lines 424, a read line 436, and a write line 438. In the embodiment shown, address lines 420 are coupled to the address lines of the CV storage 308 and further coupled to the output lines of the shift register 408. The address lines 420 may be bi-directional so that they can receive address bits from the shift register 408, or provide address bits to the CV storage 308. The data/CV lines 422 are coupled to the data lines of the CV storage 308 in the illustrated embodiment, and may carry compensation value information and other information, including evaluation threshold information that may be provided to comparator 410 and error generator 412. In one embodiment, at least some (if not all) of the data/CV lines 422 are also bi-directional so that they can be used to provide data (e.g. for write purposes) to the CV storage 308, or to receive data (e.g. for read purposes) from the CV storage 308. The error lines 424 in this embodiment are coupled to the output of the error generator 412, and may be used to convey the information generated therein. The read and write lines 436, 438 are coupled to the CV storage 308 in the illustrated embodiment. Read line 436 may be used to send a read signal to the CV storage 308 to read a compensation value from the storage. Write line 438 may be used to send a write signal to the CV storage 308 to write an updated compensation value to the storage.

Figure 9:
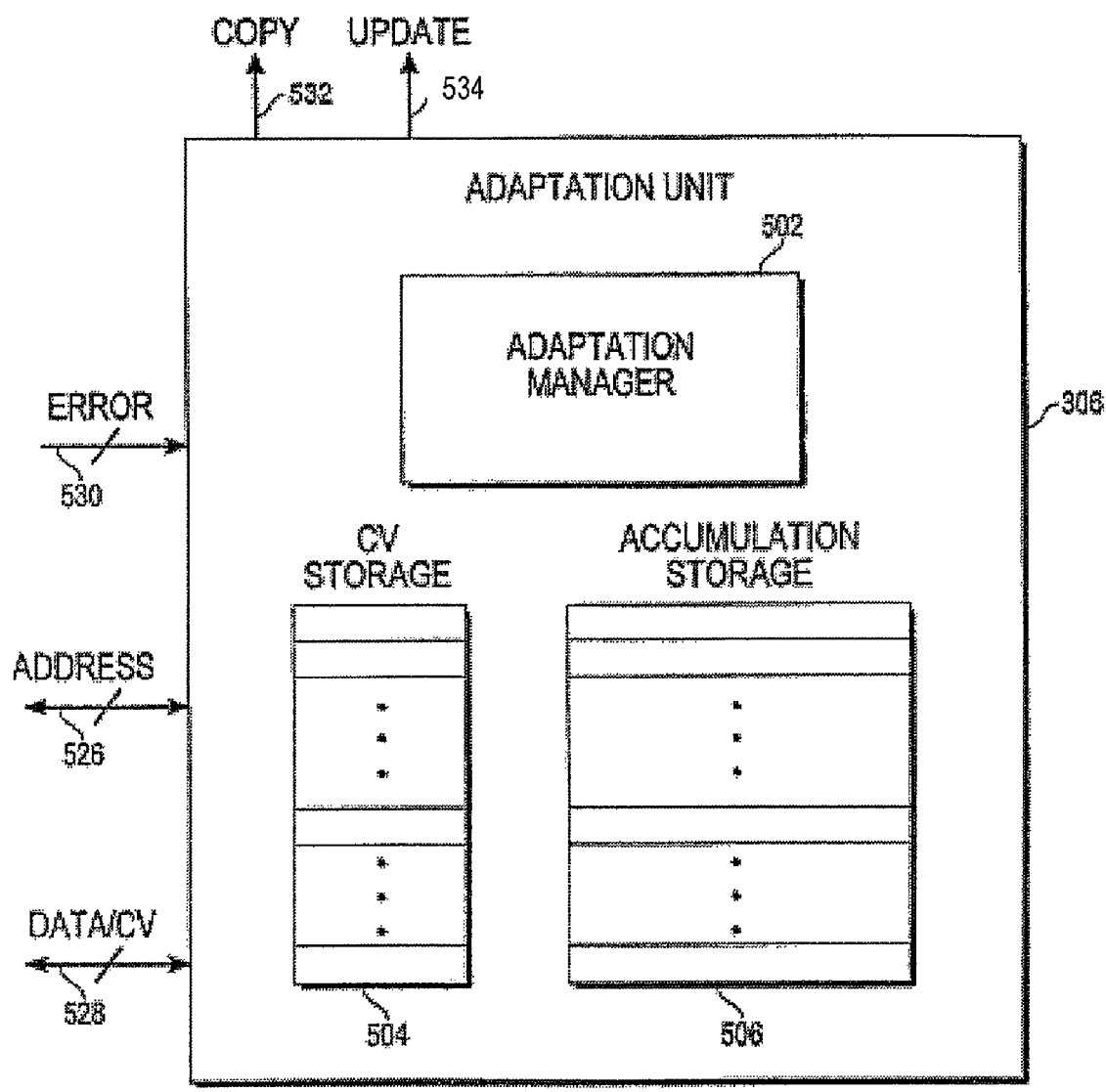
FIG. 9 is a block diagram of one embodiment of an adaptation unit.

FIG. 9 is a block diagram of one embodiment of an adaptation unit. In the embodiment shown, adaptation unit 306 is coupled to receive error information via error lines 530, and is also coupled to bi-directional address lines 526 and bi-directional data/CV lines 528. Adaptation unit 306 also configured to convey copy information on copy line 532 and update information on update line 534. In the embodiment shown, adaptation unit 306 includes an adaptation manager 502, a CV storage unit 504, and an accumulation storage unit 506.

Adaptation manager 502 may be configured to receive error information from the currently coupled receiver, and to maintain the accumulation values in the accumulation storage 506 and the compensation values in the CV storage 504 accordingly. More specifically, the adaptation manager 502 may receive a plurality of sets of error information from the currently coupled receiver 302. Each set of error information may correspond to a particular combination of history bits, while each set of error information may indicate whether the compensation value corresponding to that particular combination of history bits should be increased or decreased (the error information is received on lines 530 and the history bits are received on lines 526). When the adaptation manager 502 receives a set of error information (and its corresponding history bits), it may use the history bits to access a location in the accumulation storage 506 that corresponds to the set of history bits. The adaptation manager 506 may then determine, based upon the error information, whether to increase or decrease the accumulation value stored in that location of the accumulation storage 506. The error information may include a sign bit indicating whether the compensation value should be increased or decreased, as well as another bit indicating the amount the compensation value should be increased or decreased. Based upon this information, the adaptation manager 502 may increase or decrease the accumulation value by a certain amount (the amount may be determined based upon the non-sign bit). Notice that it is the accumulation value in the accumulation storage 506, not the compensation value in the CV storage 504, that is increased or decreased in response to a set of error information. Thus, even though the error information indicates whether the compensation value should be increased or decreased, the adaptation manager 502 may forego increasing or decreasing the compensation value in response to a set of error information. Accordingly, the adaptation manager 502 may effectively treat each set of error information as a "vote" to increase or decrease the compensation value corresponding to the particular combination of history bits. Only if there are enough votes to increase or decrease the compensation value will the adaptation manager 502 actually increase or decrease the compensation value.

Another function that may be performed by adaptation manager 502 is determining a change to the evaluation threshold voltage for a given receiver 302. In such embodiments, each receiver 302 may be serviced by adaptation unit 306 in a round-robin sharing scheme in order to enable these evaluation threshold voltages to be updated in a timely manner. Adaptation manager 502 may determine from the received error information the difference between the signal voltage and the evaluation threshold voltage, and compare this difference to the value of a midpoint voltage. Based on such a comparison, adaptation unit 502 may generate an LT signal or a GT signal, which may be used internally to indicate whether or note the evaluation threshold voltage is to be pushed away from or pulled toward the signal voltage. In either case, the evaluation threshold unit may be adjusted toward a target threshold voltage. Adaptation unit 502 may also query the received error information to determine whether or not an indication of a transition bit is present, and may use this information, along with the LT or GT signal generated, to determine the rate at which the evaluation threshold voltage should be changed. This information may then be provided to the corresponding receiver 302 through various ones of the data/CV lines 528. Comparator 410 and error generator 412 of receiver 302 may receive this information, and may evaluate the next signal sample based thereupon.

It should be noted that while the discussions above has been directed toward single-ended embodiments, embodiments that utilize differential signaling are also possible and contemplated.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A receiver circuit comprising:
a voltage measuring unit, wherein the voltage measuring unit is configured to determine a signal voltage of a received signal;
a comparator unit configured to calculate a difference between the signal voltage and an evaluation threshold voltage, and further configured to:
generate a first control signal responsive to the difference being greater than a value of a midpoint voltage, wherein the midpoint voltage is half of a difference between a mean logic voltage for a logic 1 and a mean logic voltage for a logic 0;
generate a second control signal responsive to the difference being less than the value of the midpoint voltage; and
an adjustment unit, wherein the adjustment unit is configured to:
adjust the evaluation threshold voltage toward signal voltage responsive to the first control signal being generated; and
adjust the evaluation threshold voltage away from the signal voltage responsive to the second control signal being generated.

2. The receiver circuit as recited in claim 1, wherein the adjustment unit is configured to adjust the evaluation threshold voltage toward a target threshold voltage, wherein the target threshold voltage is off center with respect to a difference between a maximum logic voltage and a mean logic voltage for a logic 0, wherein the adjustment unit is configured to pull the evaluation threshold voltage toward the target threshold voltage responsive to generation of the first control signal, and further configured to push the evaluation threshold voltage toward the target threshold voltage responsive to generation of the second signal.

3. The receiver circuit as recited in claim 2, wherein the target threshold voltage for a current cycle N is biased toward the maximum logic voltage if a signal received in a previous cycle N−1 was evaluated as a logic 1.

4. The receiver circuit as recited in claim 3, wherein the target threshold for the current cycle N is biased toward the mean logic voltage for a logic 0 if the signal received in a previous cycle N−1 was evaluated as a logic 0.

5. The receiver circuit as recited in claim 2, wherein the target threshold voltage is biased toward a non-transition logic value.

6. The receiver circuit as recited in claim 1, wherein the comparator unit is further configured to determine if the received signal is a logic 0 or a logic 1 based on comparing the signal voltage to the evaluation threshold voltage, wherein the comparator is configured to evaluate the received signal as a logic 0 responsive to the signal voltage being less than the evaluation threshold voltage, and is further configured to evaluate the received signal as a logic 1 responsive to the signal voltage being greater than the evaluation threshold voltage.

7. The receiver circuit as recited in claim 1, wherein the voltage measuring unit is an analog-to-digital converter, wherein the analog-to-digital converter is configured to generate a digital value from the received signal and to provide the digital value to the comparator unit.

8. The receiver circuit as recited 1, wherein:
the adjustment unit responsive to the comparator detecting a logical transition is configured to:
adjust the evaluation threshold at a first rate if the first control signal is generated; and
adjust the evaluation threshold at a second rate if the second control signal is generated; and
wherein the adjustment unit responsive to determining that no logical transition occurred is further configured to:
adjust the evaluation threshold at the second rate if the first control signal is generated; and
adjust the evaluation threshold at the first rate if the second control signal is generated.

9. A method comprising:
transmitting a signal carrying digital data on a signal line;
receiving the signal from the signal line;
determining a signal voltage of the received signal;
calculating a difference between the signal voltage and an evaluation threshold voltage;
generating a first control signal responsive to the difference being greater than a value of a midpoint voltage, wherein the midpoint voltage is half of a difference between a mean logic voltage for a logic 1 and a mean logic voltage for a logic 0;
generating a second control signal responsive to the difference being less than the value of the midpoint voltage;
adjusting the evaluation threshold voltage toward the signal voltage responsive to the first control signal being generated; and
adjusting the evaluation threshold voltage away from the signal voltage responsive to the second control signal being generated.

10. The method as recited in claim 9, further comprising adjusting the evaluation threshold voltage toward a target threshold voltage, wherein the target threshold voltage is off center with respect to a difference between a maximum logic voltage and a minimum logic voltage.

11. The method as recited in claim 10, wherein the target threshold voltage for a current cycle N is biased toward the maximum logic voltage if a signal received in a previous cycle N−1 was evaluated as a logic 1.

12. The method as recited in claim 11, wherein the target threshold voltage for the current cycle N is biased toward the minimum logic voltage if the signal received in the previous cycle N−1 was evaluated as a logic 0.

13. The method as recited in claim 11, further comprising determining if the received signal is a transition logic value or a non-transition logic value for the current cycle N, wherein the received signal is the non-transition logic value if logic value for the current cycle N is equivalent to a logic value for the signal received in the previous cycle N−1.

14. The method as recited in claim 13, further comprising biasing the target threshold toward a non-transition logic value.

15. The method as recited in claim 9, further comprising evaluating the received signal as a logic 0 or a logic 1, wherein the received signal is evaluated as a logic 0 responsive to the signal voltage being less than the evaluation threshold voltage, and wherein the received signal is evaluated as a logic 1 responsive to the signal voltage being greater than the evaluation threshold voltage.

16. The method as recited in claim 9, further comprising:
adjusting the evaluation threshold at a first rate responsive to the generation of the first control signal and determining that a logical transition has occurred;
adjusting the evaluation threshold at a second rate responsive to the generation of the second control signal and determining that a logical transition has occurred;
adjusting the evaluation threshold at the second rate responsive to generation of the first control signal and determining that no logical transition has occurred; and
adjusting the evaluation threshold at the first rate responsive to generation of the second control signal and determining that no logical transition has occurred.

17. An integrated circuit comprising:
a transmitter configured to transmit a signal containing digital data onto a signal line coupled thereto; and
a receiver coupled to the signal line and configured to receive the signal, wherein the receiver is configured to:
determine a signal voltage of the received signal;
calculate a difference between the signal voltage and an evaluation threshold voltage;
generate a first control signal responsive to the difference being greater than a value of a midpoint voltage, wherein the midpoint voltage is half of a difference between a mean logic voltage for a logic 1 and a mean logic voltage for a logic 0;
generate a second control signal responsive to the difference being less than the value of the midpoint voltage;
adjust the evaluation threshold voltage toward the signal voltage if the first control signal is generated; and
adjust the evaluation threshold voltage away from the signal voltage if the second control signal is generated.

18. The integrated circuit as recited 17, wherein the receiver is further configured to adjust the evaluation threshold voltage toward a target threshold voltage, wherein the target threshold voltage is off center with respect to a difference between a maximum logic voltage and a minimum logic voltage.

19. The integrated circuit as recited in claim 18, wherein the receiver is further configured to detect whether or not the received signal is a transition bit or a non-transition bit, wherein a transition bit is detected responsive to determining that the received signal has a different logic value than a previous received signal received during a cycle immediately previous to a current cycle in which the received signal is evaluated.

20. The integrated circuit as recited in claim 17, wherein:

the receiver circuit responsive to detecting a transition bit is configured to:

adjust the evaluation threshold at a first rate if the first control signal is generated; and adjust the evaluation threshold at a second rate if the second control signal is generated; and wherein the receiver responsive to detecting a non-transition bit is further configured to:

adjust the evaluation threshold at the second rate if the first control signal is generated; and adjust the evaluation threshold at the first rate if the second control signal is generated.

* * * * *